United States Patent
Wall et al.

(10) Patent No.: US 6,654,806 B2
(45) Date of Patent: Nov. 25, 2003

(54) METHOD AND APPARATUS FOR ADAPTABLY PROVIDING DATA TO A NETWORK ENVIRONMENT

(75) Inventors: Gerard A. Wall, San Jose, CA (US); James G. Hanko, Redwood City, CA (US); J. Duane Northcutt, Menlo Park, CA (US); Alan T. Ruberg, Foster City, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/289,801

(22) Filed: Apr. 9, 1999

(65) Prior Publication Data

US 2003/0037160 A1 Feb. 20, 2003

(51) Int. Cl.[7] ............................................... G06F 5/16
(52) U.S. Cl. ........................ 709/225; 709/202; 709/207; 709/223; 709/247
(58) Field of Search ................................ 709/202, 206, 709/219, 228, 229, 231, 233, 234, 235, 246, 207, 203, 201, 223, 224, 225, 247; 370/230

(56) References Cited

U.S. PATENT DOCUMENTS

| | | | | |
|---|---|---|---|---|
| 5,442,749 A | | 8/1995 | Northcutt et al. ........... 709/219 |
| 5,953,506 A | * | 9/1999 | Kalra et al. ................. 709/231 |
| 6,014,694 A | * | 1/2000 | Aharoni et al. ............. 709/219 |
| 6,101,531 A | * | 8/2000 | Eggleston et al. .......... 709/206 |
| 6,104,392 A | * | 8/2000 | Shaw et al. ................. 709/207 |
| 6,345,038 B1 | * | 2/2002 | Selinger ..................... 370/230 |

* cited by examiner

Primary Examiner—Kenneth R. Coulter
Assistant Examiner—Paul H. Kang
(74) Attorney, Agent, or Firm—O'Melveny & Myers LLP

(57) ABSTRACT

A method and apparatus for adaptably providing data to a virtual desktop system is described. The computational service provider is configured to prepare and transmit one or more data streams through a viable interconnection fabric to multiple HIDs. The data stream is configured by the computational service provider to adaptably meet the performance needs of the HID receiving the data stream. This enables multiple HIDs to receive variants of the same data stream that may differ in quantity, quality, and/or data format. In one embodiment of the invention, a decode module prepares data for transport by separating decoded data into individual processes. Before a HID may connect to a process the HID is authenticated. The processes are further adjusted by a resource optimization module to take into account the characteristics of each HID requesting access. The resource optimization module also takes into account the characteristics of the interconnection fabric coupling the HID and the computational service provider.

3 Claims, 11 Drawing Sheets

METHOD AND APPARATUS FOR ADAPTABLY PROVIDING DATA TO A NETWORK ENVIRONMENT

FIELD OF THE INVENTION

This invention relates to the field of computer software. More specifically, the invention relates to a method and apparatus for adaptably providing data to a network environment.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever. Sun, Sun Microsystems, the Sun logo, Solaris, SPARC, "Write Once, Run Anywhere", Java, JavaOS, JavaStation and all Java-based trademarks and logos are trademarks of Sun Microsystems, Inc. in the United States and in other countries.

BACKGROUND

A computer network is sometimes used to deliver streams of data (such as video data) to one or more computers on a network. The video data can be presented at different levels of quality, with higher quality meaning larger amounts of data needs to be transmitted. Different receiving computers may not be capable of displaying the same quality of data. Currently there is no effective way of sending video data with different levels of quality to different receiving computers. The problem can be understood by reviewing current networks and schemes for data transmission.

Networks Generally

A network is an amalgamation of interconnected computers. Computational devices properly connected to the network may utilize the network to communicate with other devices that are coupled to the network. A computational service provider computer, for example, may use a network to transmit a video data stream to a client computer for display. There are a variety of different techniques for propagating data to devices connected to the network. For example, data may be sent from a source computer to a destination computer, broadcast from one computer to all other computers on the network, or sent from a source computer to a select group of destination computers. Each of these methods is inherently limited in its ability to adequately balance the needs of the user with the performance characteristics of the network. For example, current data dissemination techniques do not provide a way to ensure data is displayed only to an intended recipient while also taking into account the characteristics of the network link that may affect transmission of the data to be displayed. Current methods for propagating data throughout a network lack a scheme for explicitly authorizing users to connect to a particular data stream and also do not provide a way to effectively control the quantity and quality of data transmitted to the user. A general discussion of the existing techniques for sending data across a network and the problems associated with using such methods follows.

Unicasting

Sending data from a source computer to a single destination computer is called unicasting. This is the standard form of service provided by networking protocols such as the Transmission Control Protocol (TCP). TCP is a connection-oriented transport protocol designed to provide network functionality to the user. TCP typically works in collaboration with other protocols such as the Internet Protocol (IP) and Media Access Control (MAC), protocols such as Ethernet in order to provide the user with network services. When data is transmitted from one location to another location using TCP the data is placed into packets (e.g. datagrams). Each packet of data is assigned a source address and a destination address. The source address indicates which computer is responsible for sending the data and the destination address indicates which computer is to receive the data that is sent.

Referring now to FIG. 1 an example of unicasting is illustrated. Network nodes 101–105 are five separate computational devices. Personal computers and network equipment such as routers, switches, and/or hubs are examples of network nodes 101–105. Other devices such as laptops and Personal Desktop Assistants (PDAs) may also function as network nodes 101–105.

Network nodes 101–105 may transmit data to network nodes 151–154 using network 125. In some cases, network 125 achieves connectivity by using the Internet. The Internet is a global computer network comprised of numerous other networks that are all capable of communicating with one another using a standardized set of protocols. In other instances network 125 is representative of a wide area network or any other type of data transmission medium that allows nodes 101–105 to communicate with nodes 151–154.

Unicasting enables a data source to transmit data to a data destination. The data source is the device tasked to send the data and the data destination is the device the data is directed to. If, for example, network node 103 transmits data to network node 154 using path 120, then network node 103 is the data source and network node 154 is the data destination. If, however, network node 154 sends data back to network node 103, then network node 154 becomes the data source and network node 103 becomes the data destination. Data that is unicast may also be sent between two computers residing on the same network. For example, network node 101 may send data to and receive data from network node 105. In this situation, data is not transmitted through network 125 but is sent using path 121.

A problem with unicasting is that is does not allow for the efficient transfer of data to multiple computers. If, for example, a user were to want to display a video on a group of recipient nodes that user would have to send individual copies of the video to each recipient. Sending multiple copies of the same file to each recipient utilizes additional processor resources on the transmitting node and wastes network resources. In such situations, the amount of users that may receive data is constrained by the amount of bandwidth available. Unicasting does not provide a way to control the quantity and quality of data sent to the user. Additionally, unicasting schemes generally lack a mechanism for authorizing users to connect to a particular data stream.

Broadcasting

Another technique used for distributing data is referred to as broadcasting. When data is broadcast, it is sent to every node connected to the network. Broadcast services are typically provided by low-level network layer protocols such as the Internet Protocol (IP). Data that is broadcast is sent in a uniform data format. For example, a video broadcast may be sent to all recipients using the MPEG-2 data format. Receiving nodes that lack the ability to processes MPEG-2 data cannot display the broadcast. Thus, a problem with broadcasting is that each recipient is confined to utilizing a particular data format.

Referring now to FIG. 2 an example of broadcasting is illustrated. A problem with broadcasting is that data is sent to every node on the network, regardless of whether the node is interested in receiving the broadcast. For example, if node 205 begins broadcasting data all remaining nodes 201–204 on network 200 receive the broadcast data. Each remaining node 201–204 is required to perform some processing in order to determine whether it is interested in the broadcast data.

Broadcast data may be confined to a certain portion of a network (e.g. a subnet or a LAN). For example, data broadcast using path 220 may be confined to network 200 and not transmitted to network 250 via network 268. When this is done network nodes 251–256 do not receive or process any data related to the broadcast. However, even localized broadcasts are undesirable because they still require all nodes on the subnet performing the broadcasting to perform some processing in order to determine whether or not it is interested in the broadcast data. Thus, broadcasts do not provide a way to efficiently allocate network resources based upon a network's characteristics. Broadcasting does not provide a way to control the quantity and quality of data sent to the user and lacks a mechanism for authorizing users to connect to a particular data stream.

Multicasting

Multicasting is a technique for transmitting data from one computer to many different computers or from many computers to many other computers. Transmitting a corporate message to a group of employees or sending an audio feed to numerous computer users are examples of multicasting. Multicasting is widely used to propagate data to multiple network nodes (e.g. computers).

In a multicast environment, a properly configured computational device can perform one operation to transmit data to multiple destination devices. For example, using multicasting a person can transmit video data to many different computers by initiating a single multicasting session. Under the multicast model only network nodes that are actively interested in receiving a particular multicast have such data routed to them. On some networks, certain network nodes automatically ignore multicast data. For example, some network routers are configured to prevent multicast data from entering a subnet. Computational devices designed to implement firewalls or other such filtering mechanisms may also be configured to ignore multicast data.

Multicasting is typically utilized to disseminate data to a plurality of network nodes in a single transmission. To support multicasting the network infrastructure as well as the sending and receiving node(s) are multicast enabled. This includes any intermediate routers that may be involved in transmitting data between networks. The computational device responsible for performing the multicasting is not required to maintain a list of recipients. Instead, the device transmits a single copy of the multicast message to all the members of a host group. Copies of the message are made when a router determines divergent paths are necessary to deliver the message to host group members.

A problem with multicasting is that multicast enabled networks are not capable of adaptably meeting the performance needs of each network, or network node, that receives the multicast data. As a result, multicast networks do not provide a way for recipients to receive variants of the same data that differ in quantity, quality, and/or data format.

Multicasting Components

Referring now to FIG. 3 an illustration of a network topology configured to support multicasting is shown. Sending node 300 and receiving nodes 301 are connected to network 325. Network 325 is a Local Area Network (LAN). The remaining nodes 302–304 attached to network 325 are not configured to accept multicast data. Sending node 300 and receiving node 301, however, are configured to accept multicast data. This is accomplished by 1) installing the appropriate network hardware and 2) configuring the two nodes to accept and transmit the necessary protocols (e.g. TCP, IGMP). Additionally, a software application capable of sending and/or receiving multicast data is necessary. When sending nodes 300 and receiving nodes 301 are properly configured data can be multicast from sending node 300 to receiving node 301 along path 322. Data that is multicast may also be sent to multiple nodes. For example, it is possible to configure remaining nodes 302–304 to accept and/or perform multicasting.

Transmitting data to other networks, however, requires additional configuration and/or equipment. For example, for network 350 to begin receiving multicast data a multicast router 330 is required. Multicast router 330 distributes and replicates the multicast data stream as is necessary to provide requesting network nodes with data. To have the ability to transmit multicast data between networks requires that all routers present on the path from network 325 to network 350 be multicast capable. For example, if data is transmitted from network 325 to network 350 using path 344 then networks 375–377 are multicast capable. However, if networks 375–377 do not contain routers that support multicasting, tunneling may be used to send multicast data through network 340 using networks 378–380. Tunneling is used to connect islands of multicast routers separated by links that do not support multicasting (e.g. networks 378–380). When this approach is used multicast datagrams are encapsulated into standard unicast datagrams and sent through network 340. Tunneling may be used to send multicast data across the Internet (e.g. MBONE) or any other type of viable communication network.

Network 325 and network 350 both contain a firewall 399. Firewalls 399 prevent unauthorized data from entering a network. When a firewall 399 is present on a network, such as network 325, network 350, or network 340, the firewall may need to be reconfigured to permit multicast traffic. Network 325 and network 350 may also contain multicast filtering switches. A multicast filtering switch provides a way to localize the amount of data traffic disseminated on a LAN. If, for example, a filtering switch is installed on network 325, data will only be sent to participating nodes rather than to all segments on the LAN. A filtering switch allows receiving node 301 to receive multicast data from sending node 300 without interfering with remaining nodes 302–304.

If all participating networks are properly configured to accept multicast data sending node 300 may send an identical copy of data 333 to all the nodes that request it. For example, data may be sent using path 344 from sending node 300 to receiving nodes 301, 352, 353, and 354.

Sending and Receiving Multicast Data

IP multicasting is a form of multicasting data across the Internet. IP multicasts adhere to an addressing standard defined by the Internet Assigned Numbers Authority (IANA). To send data, the sender specifies a destination address which is representative of a host group and uses the "Send IP" operation to transmit the data. The "Send IP" operation is the same operation used to transmit unicast data. To receive multicast data a user's host application requests membership in the multicast host group associated with a particular multicast. For example, if the user wants to view a multicast of events taking place on the Space Shuttle, the user may request to view that event by issuing a membership request. The user's membership request is then communicated to the network hardware which disseminates the request. In some instances the request is communicated to the LAN router. If data is to be sent off the LAN the request is communicated to intermediate routers between the location of the sender and the receiver. The user's membership request also causes the receiving computer to start filtering for addresses associated with the multicast address identified in the initial request. The receiving computer's network interface card, for example, starts filtering for the specific data link layer addresses associated with the multicast. If the multicast is initiated outside the LAN the WAN router delivers the requested multicast data to the LAN router. The LAN router builds the message and forwards it to the receiving computer. The receiving computer listens for expected multicast data and passes received data to the TCP/IP protocol stack, which makes the data available as input to the user's application (e.g. a video viewing application).

A problem with IP multicasting is that such multicasts do not provide a way to adaptably meet the performance needs of each node that wishes to receive multicast data. As a result, multicast networks do not provide a way for recipients to automatically receive variants of the same data stream that differ in quantity, quality, and/or data format.

SUMMARY OF THE INVENTION

A method and apparatus for adaptably providing data to a network environment is described. In one embodiment of the invention, the network environment is a virtual desktop system that provides services to the end-user by dividing functionality between a centralized computational service provider and a HID. Data and computational functionality is provided by the computational service provider's data sources via a centralized processing arrangement. At the HID, functionality is limited to that which generates output to the user (e.g. display and speakers), takes input from the user (e.g. mouse and keyboard) or other peripherals that the user may interact with (e.g. scanners, cameras, removable storage, etc.). The Human Interface Device (HID) is connected to the computational service provider via an interconnection fabric and is capable of receiving data and displaying such data to the user.

In accordance with one embodiment of the invention, the computational service provider is configured to transmit one or more data streams through a viable interconnection fabric to multiple HIDs. The data stream is configured by the computational service provider to adaptably meet the performance needs of the HID receiving the data stream. This enables multiple HIDs to receive variants of the same data stream that may differ in quantity, quality, and/or data format. In one embodiment of the invention, the quantity and/or quality of data sent to a HID is dependant upon the conditions encountered by the computational service provider when it attempts to transmit data across the interconnection fabric.

A decode module residing on the computational service provider aids in the optimization process. The decode module is capable of processing numerous data formats and, for example, may prepare different types of video or audio data for transmission to HIDs that request it (e.g. MPEG, AVI, WAV, AIFF, etc . . . ). In one embodiment of the invention, the decode module prepares data files for transmission to multiple HIDs by converting a requested data file into decoded data and then separating the decoded data into a plurality of individual process. Having the decode module decode the data file a single time when multiple requests for the same file are made reduces processor overhead.

Each process is correlated to an active session on the computational service provider and may have a different set of characteristics. For example, in one embodiment of the invention, each process is modified to take into account the performance limitations and/or advantages of a receiving HID. In other instances, the processes have a set of common characteristics determined by the decode module. When a process is modified, the amount of resources needed to simultaneously provide data to multiple HIDs is reduced. Thus, modification of a process results in control over the amount of data that is to be placed on the interconnection fabric.

The computational service provider is also capable of determining whether a particular user has permission to access the processes resulting from the data stream generated by decode module. In one embodiment of the invention, the computational service provider contains a resource optimization module configured to determine how much bandwidth to consume while transmitting a particular process to a HID. The resource optimization module utilizes the bandwidth allocation message to determine how to adjust the process or data stream before transmitting it to a requesting HID.

In one embodiment of the invention, the process used by the resource optimization module to determine how much of the available network bandwidth to utilize while transmitting data to a particular HID is as follows. Initially, a HID issues a request for data to computational service provider. The computational service provider responds by transmitting a message identifying its bandwidth preference to the requesting HID. The HID then writes back a message communicating the amount of bandwidth actually available. The computational service provider, after taking into account any user preferences that exist, adjusts the requested process to consume an appropriate amount of bandwidth.

DETAILED DESCRIPTION

A method and apparatus for adaptably providing data to a network environment is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

The Virtual Desktop Environment

An embodiment of the present invention utilizes a system architecture referred to as the virtual desktop system. The virtual desktop system may be analogized to other highly partitioned systems. For example, a public telephone company maintains powerful and sophisticated processing power and large databases at central offices. However, the human interface device, the telephone, is relatively simple and does not require upgrading when new features or services are added by the telephone company. The telephone itself becomes an appliance of low cost and extremely low obsolescence. Similarly, the display monitor of most computer systems has low obsolescence, and is typically retained through most desktop system upgrades.

The virtual desktop system provides services to the end-user by dividing functionality between a centralized computational service provider and a "Human Interface Device" (HID). Data and computational functionality is provided by the computational service provider's data sources via a centralized processing arrangement. At the HID, functionality is limited to that which generates output to the user (e.g. display and speakers), takes input from the user (e.g. mouse and keyboard) or other peripherals that the user may interact with (e.g. scanners, cameras, removable storage, etc.). The HID is connected to the computational service provider via an interconnection fabric and is capable of receiving data and displaying such data to the user. A user's virtual desktop may be obtained from the computational service provider and viewed from any HID that is coupled to the interconnection fabric.

Figure 5:
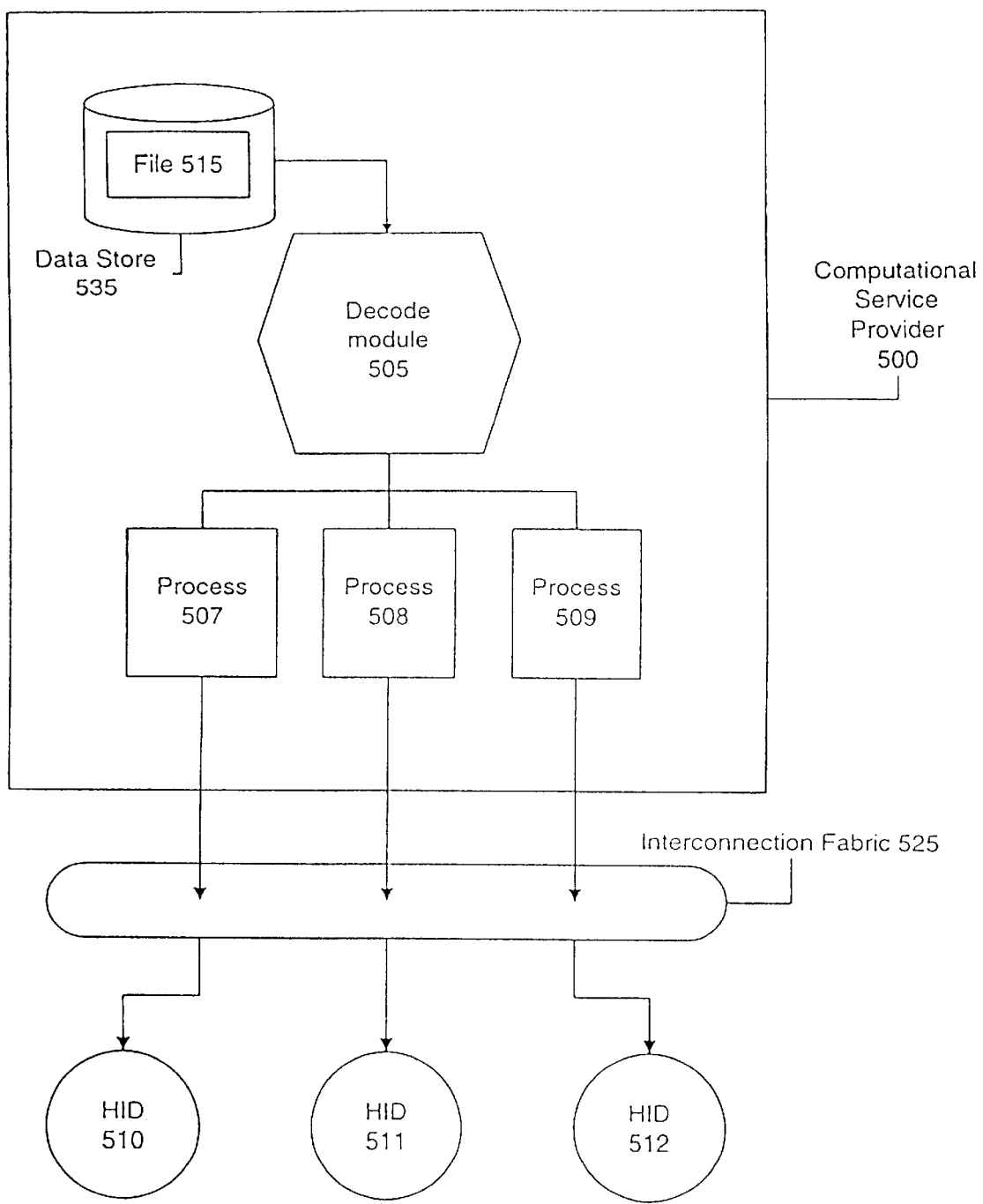
FIG. 5 illustrates an embodiment of the invention that utilizes a decode module to prepare data for distribution to multiple HIDs.

The functionality provided by the virtual desktop system is partitioned between a display and input device, and data sources or services. In one embodiment of the invention, the display and input device is a HID. The partitioning of this system is such that state and computation functions have been removed from the HID and reside on data sources or services. A centralized computational service provider may provide the data sources or services. In one embodiment of the invention, one or more services communicate with one or more HIDs through a connective fabric, such as a network. An example of such a system is illustrated in FIG. 5. Referring to FIG. 5, the system consists of a computational service provider 500 that communicates data through interconnection fabric 525 to HIDs 510–512. HIDs 510–512 display the output of a computational service provider to the user on a virtual desktop. Users may access the same virtual desktop regardless of which HID 510–512 is used to access the computational service provider 500.

Computational Service Providers

The centralized computational service provider is responsible for providing computational capacity to the system independently of the destination the data is generated for. For example, referring now to FIG. 5, computational service provider 500 executes computer programs on behalf of multiple HID devices 510–512. Computer programs residing on computational service provider 500 are made available to HIDs 510–512 via interconnection fabric 525. If, for example, a user at a HID requests to execute a computer program, computational service provider 500 will utilize its local computational resources to begin execution of the program and then transmit the output to the HID device initiating the request. This creates the appearance that the program is executing on the HID device. This paradigm shifts the processing load from HIDs 510–512, where it traditionally resides, to computational service provider 500. As a result of this shift, maximizing the transmission capacity of the interconnection fabric responsible for adjoining the HIDs with the centralized computational service provider is increasingly important.

In the virtual desktop system, computational power and state maintenance is found in the service providers, or services. The services are not tied to a specific computer, but may be distributed over one or more traditional desktop systems such as described in connection with FIG. 4, or with traditional computational service providers. One computer may have one or more services, or a service may be implemented by one or more computers. The service provides computation, state, and data to the HIDs and the service is under the control of a common authority or manager. It is important to note that the central data source can also provide data that comes from outside of the central data source, such as for example, the Internet or World Wide Web. The data source can also be broadcast entities such as those that broadcast data such as television or radio signals.

Examples of services include X11/Unix services, archived or live audio or video services, Windows NT service, Java™ program execution service, and others. A service herein is a process that provides output data and responds to user requests and input.

It is the responsibility of the service to handle communications with HIDs currently being used to access the given service. This involves taking the output from the computational service and converting it to a standard protocol for transmission to the HID. This data protocol conversion is handled in one embodiment of the invention by a middleware layer, such as the X11 computational service provider, the Microsoft Windows interface, a video format transcoder, the OpenGL interface, or a variant of the java.awt.graphics class within the service producer machine.

In an embodiment of the invention, each service is provided by a computing device optimized for increased performance. For example, an Enterprise class machine could be used to provide X11/Unix service, a Sun MediaCenter could be used to provide video service, a Hydra based NT machine could provide applet program execution service.

The service producing computer systems connect directly to the HIDs through the interconnect fabric. It is also possible for the service producer to be a proxy for another device providing the computational service, such as a database computer in a three tiered architecture, where the proxy computer might only generate queries and execute user interface code.

Interconnection Fabric

In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the World Wide Web, and others. The interconnect fabric may be implemented with a physical medium such as a wire or fiber optic cable, or it may be implemented in a wireless environment.

In one embodiment of the invention, the interconnect fabric provides actively managed, low-latency, high-bandwidth communications between the HID and the services being accessed. One embodiment contemplates a single-level, switched network, with cooperative (as opposed to competing) network traffic. Dedicated or shared communications interconnects may be used in the present invention.

HID Devices

Figure 11:
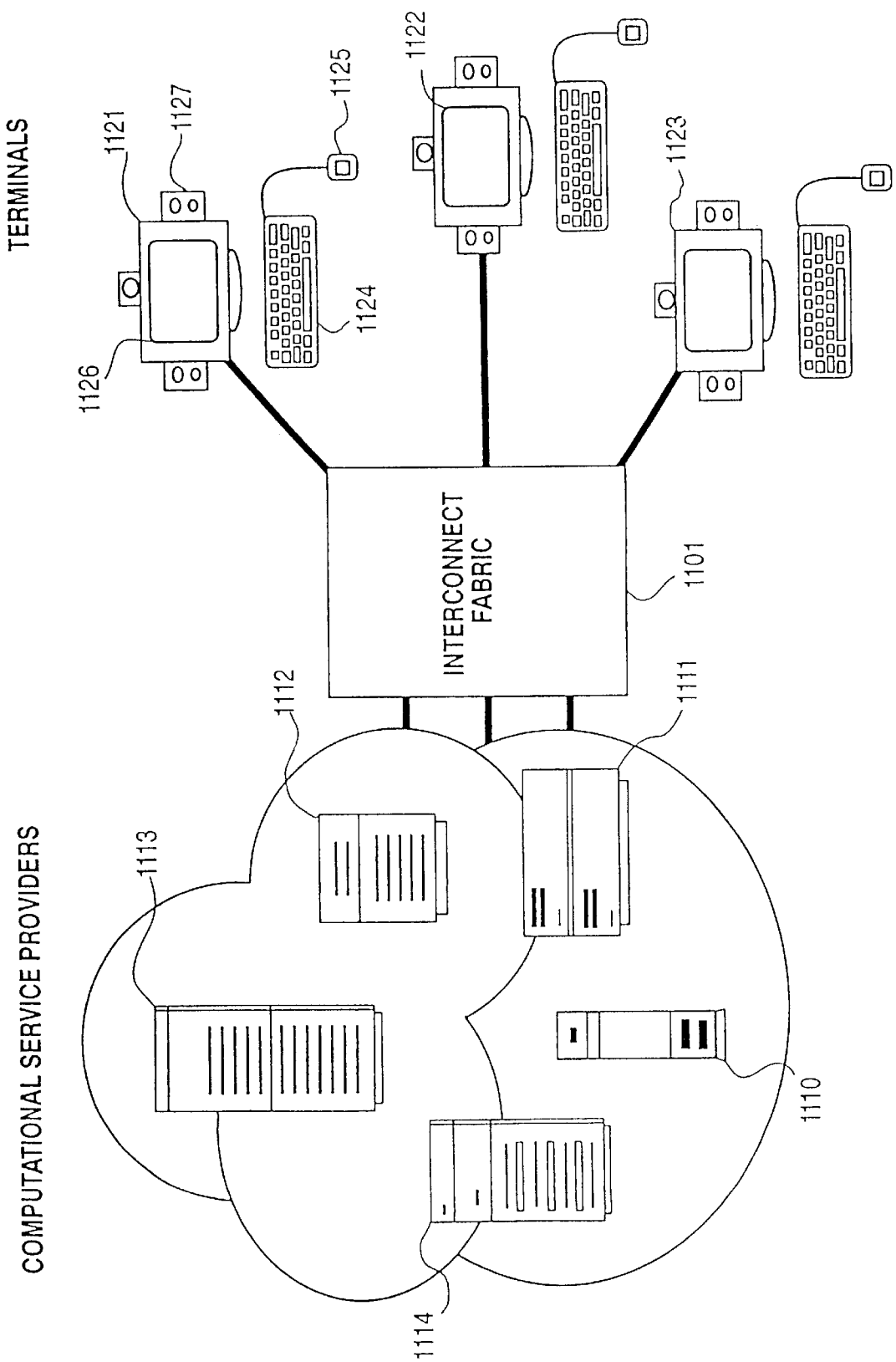
FIG. 11 illustrates a HID connected to a set of computational service providers via an interconnection fabric.

The HID is the means by which users access the computational services provided by the computational service provider, and as such the HID may also be referred to as a client, a thin-client, or workstation or terminal. FIG. 11 illustrates HIDs 1121, 1122, and 1123. A HID consists of a display 1126, a keyboard 1124, mouse 1125, and audio speakers 1127. The HID includes the electronics needed to interface these devices to the interconnection fabric 1101 and to transmit to and receive data from the services provided by computational service providers 1110–1114.

Figure 9:
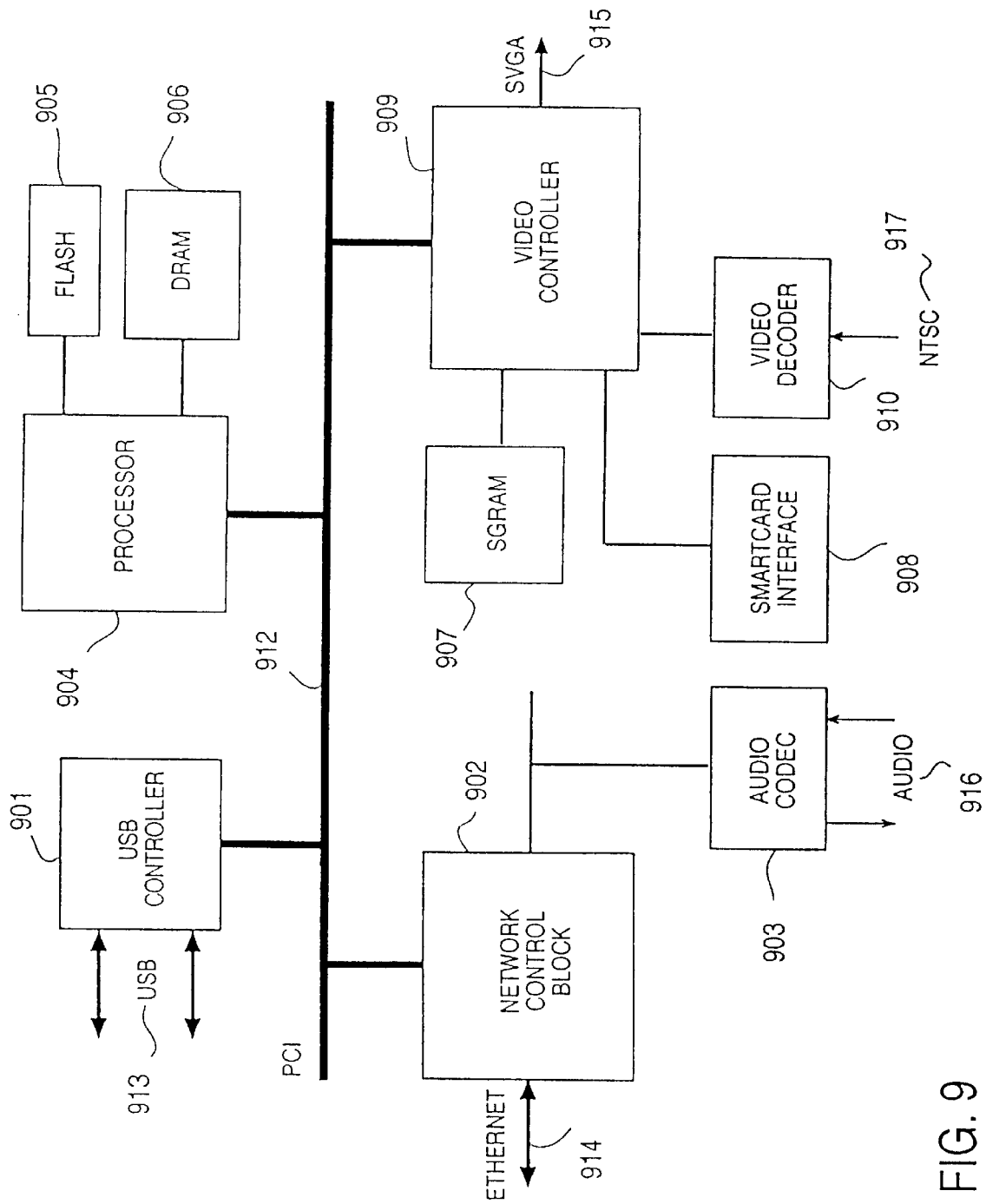
FIG. 9 illustrates a block diagram of a HID used in one embodiment of the invention.

A block diagram of the HID is illustrated in FIG. 9. The components of the HID are coupled internally to a PCI bus 912. A network control block 902 communicates to the interconnect fabric, such as an Ethernet, through line 914. An audio codec 903 receives audio data on interface 916 and is coupled to block 902. USB data communication is provided on lines 913 to USB controller 901.

An embedded processor 904 may be, for example, a Sparc2ep with coupled flash memory 905 and DRAM 906. The USB controller 901, network controller 902 and embedded processor 904 are all coupled to the PCI bus 912. Also coupled to the PCI 912 is the video controller 909. The video controller 909 may be for example, and ATI Rage128 frame buffer controller (or any other suitable controller) that provides SVGA output on line 915. NTSC or PAL data is provided into the video controller 910. A smartcard interface 908 may also be coupled to the video controller 909.

Figure 10:
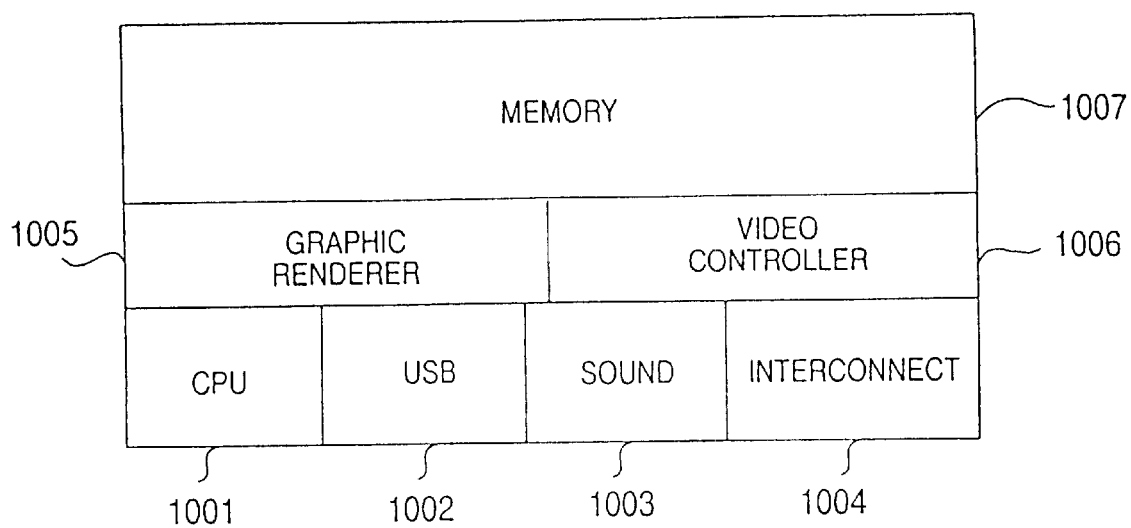
FIG. 10 illustrates a block diagram of a HID used in one embodiment of the invention.

Alternatively, the HID can be implemented using a single chip solution as illustrated in FIG. 10. The single chip solution includes the necessary processing capability implemented via CPU 1001 and graphics renderer 1005. Chip memory 1007 is provided, along with video controller/interface 1006. A universal serial bus (USB) controller 1002 is provided to permit communication to a mouse, keyboard and other local devices attached to the HID. A sound controller 1003 and interconnect interface 1004 are also provided. The video interface shares memory 1007 with the CPU 1001 and graphics renderer 1005. The software used in this embodiment may reside locally in non-volatile memory or it can be loaded through the interconnection interface when the device is powered.

According to one embodiment of the invention, the HID device requesting the output, may change without interrupting execution of the program on computational service provider 500. For example, if a video display program executing on computational service provider 500 begins outputting a video data stream to HID 512, HID 512 may elect to stop receiving the video data without interrupting execution of the video display program on computational service provider 500. The user may connect to the same video data stream by bringing up a virtual desktop on a different HID (e.g. HID 510). In one embodiment of the invention, the video data is no longer sent to HID 512 when the user removes a smart card. When the user places the same smart card into HID 510, computational service provider 500 beings transmitting the same video data to HID 512.

Operation of the Virtual Desktop System Architecture

Session Handling

The provision of services in the virtual desktop system architecture revolves around an abstraction referred to here as a session. A session is a long-lived, persistent and reliable representation of those services which are executing on behalf of a user at any point in time. A new session is created when a new user is enabled on the system, and all of a user's sessions are destroyed when a user is removed from the system. The session abstraction is maintained by a facility known as the session manager, whose duty it is to maintain the database of mappings between users and sessions, and to manage the services which make up each session. For each user that the system is aware of there are one or more sessions. The session manager offers a service to the user that allows sessions to be configured and new sessions to be created.

In the system of the invention, a user is not tied to any particular HID. A user is associated with the user session, and the session can be displayed on any HID that the user accesses. An abstraction known as the authentication manager is responsible for ensuring the legitimacy of a user and associating users with their desired session. The HID is typically in sleep, stand-by, or off mode when not in use. When a user wants to use a particular HID, an authentication exchange takes place that may consist of one or more of a smartcard, key, password, and/or biometric mechanism.

When the authentication manager validates a user, it notifies the user's current session manager, which in turn notifies all of the services within the selected session, and the session's display is composed at the user's desktop. From within a session, a user can interact with existing services, initiate new services, or kill of executing services. When the user departs from the HID (e.g. by withdrawing a smartcard) the authentication manager notes this and notifies the session manager, which in turn notifies all of its related services, which stop their display functions, and the HID returns to its dormant state. The effect of the activation and deactivation of a HID is similar to turning off the display monitor on a desktop system. The user desktop is still available and perhaps executing, but no display is generated. One advantage of the present invention is that the user desktop can be accessed on any connected HID.

Figure 1:
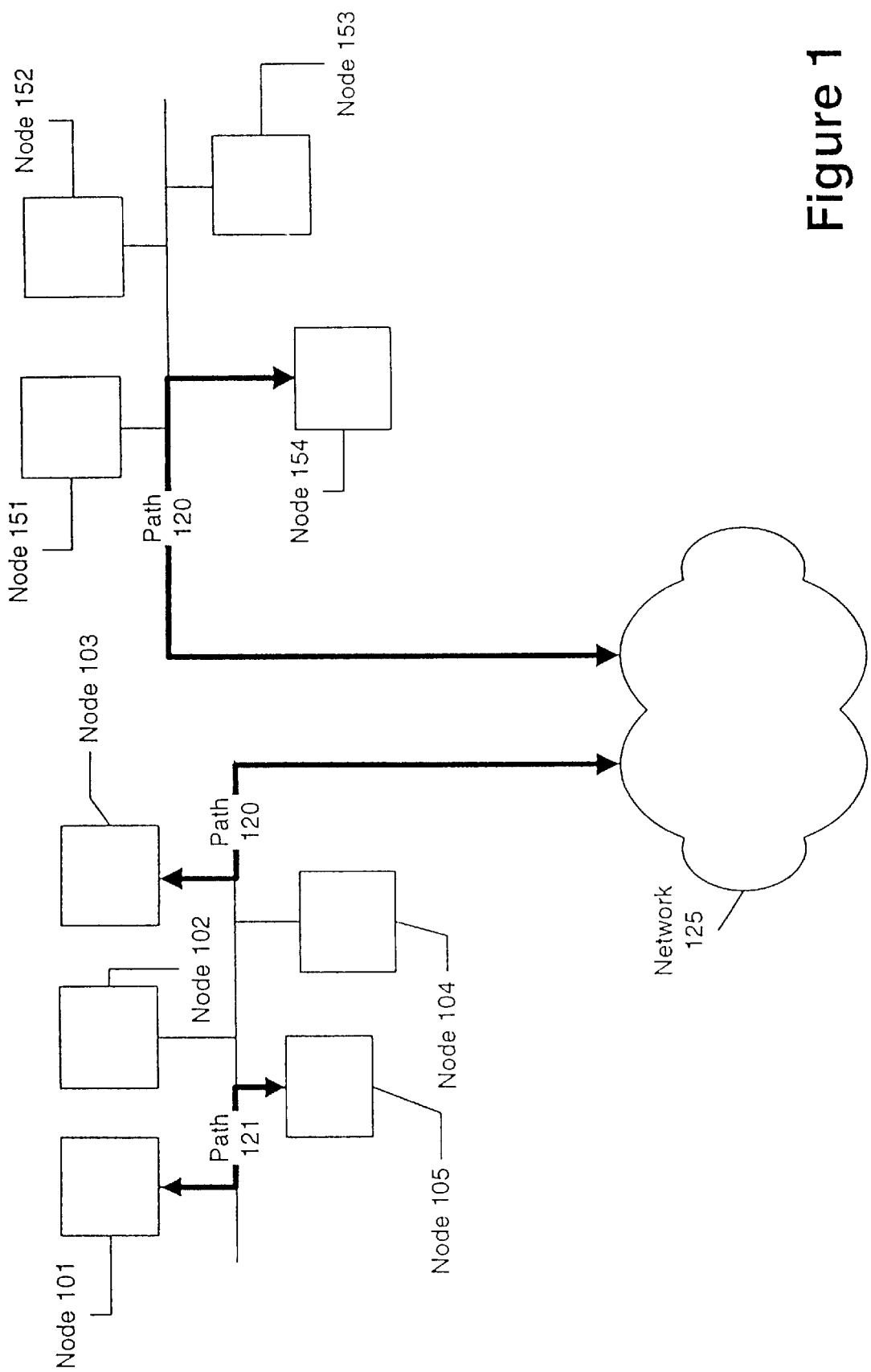
FIG. 1 is an illustration of a network configured to perform unicasting.
Figure 2:
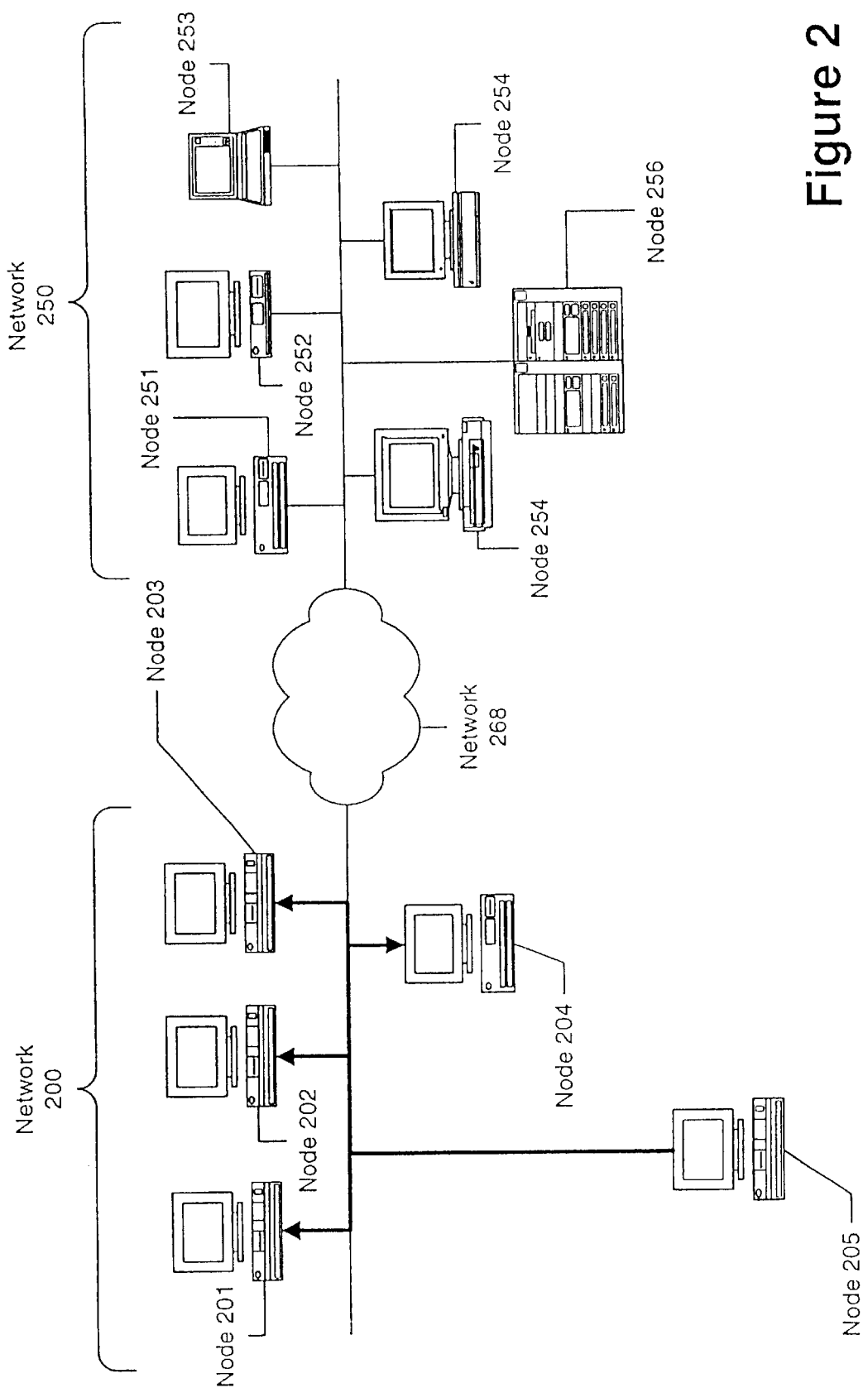
FIG. 2 is an illustration of a network configured to perform broadcasting.
Figure 3:
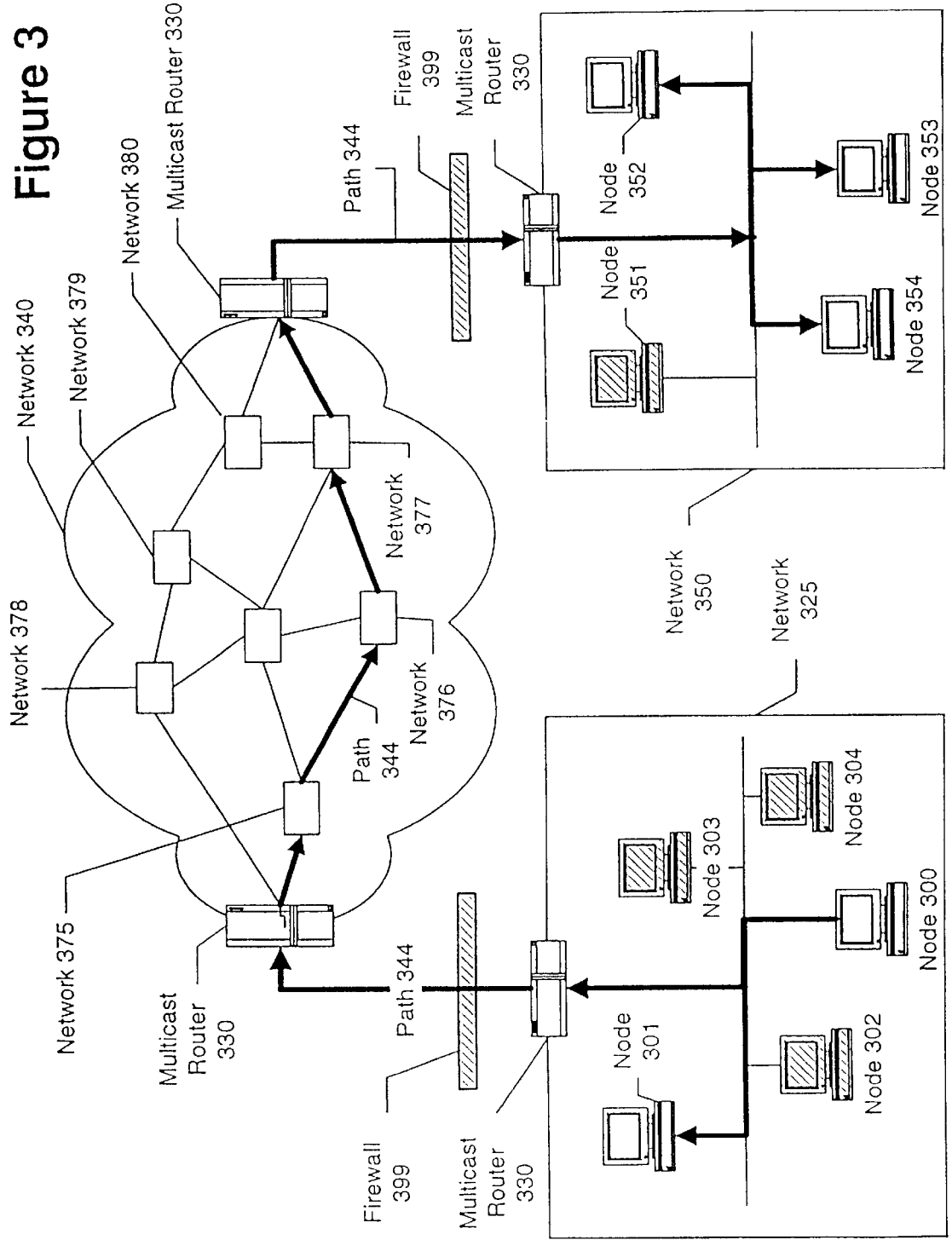
FIG. 3 is an illustration of a network configured to allow the transmission of multicast data.

FIG. 2 provides an example of session management and authorization in the present invention. Network terminal 202 is a HID, having the task of displaying output of services to a user and obtaining input to services from the user. Network terminal 202 has the ability to respond to a command (e.g., display command) received from, for example, a software program (e.g., services 230–238, authentication 204 and session manager 206) executing on a computational service provider. The input received from a user is forwarded to, for example, a service that is fulfilling a user request.

A service is a program that performs some function for a user. More than one computational service provider can execute the services that comprise a session. For example, in session 208, service 230 is executing on computational service provider 210, services 232 and 234 are executing on computational service provider 212 and services 236 and 238 are executing on computational service provider 214.

A user accesses a system (e.g., a computational service provider, a session, a service and a network terminal) by initiating a login. During login, the user is validated by authentication manager 204. Various techniques can be used to allow the user to initiate a login. For example, the user can initiate a login by pressing a key on network terminal 202.

In one embodiment of the invention, a user accesses the system by inserting a smart card in a card reader (e.g., card reader 216) attached to network terminal 202. A smart card is a card that is capable of storing information such as in a magnetic strip or memory of the smart card. The smart card can store user information such as a user's identification (i.e., user ID such as a 64-bit number) and a secret code (e.g., a 128-bit random number) that is transmitted to network terminal 202. The secret code is used during authentication.

Network terminal 202 is aware of (or can obtain) its interconnection network address and the address of authentication manager 204. When a user initiates the login, network terminal 202 initiates communication with authentication manager 204 to begin authentication. Authentication manager 204 is a program active (e.g., executing) on a computational service provider connected to network terminal 202 via an interconnection network such as a local area network (LAN), for example. It should be apparent, however, that network terminal 202 can be connected to authentication manager 204 using other interconnection network technologies such as a fiber channel loop or point-to-point cables. Network terminal 202 sends a startup request to authentication manager 204 that includes a user identification (userID).

In one embodiment of the invention, authentication manager 204 responds to the startup request by initiating an authentication to validate the user. Authentication can include any mechanism that verifies the identify of the user to the system. A key or password known only to the user, or biometrics information can be used to authenticate the user.

In an embodiment of the invention, authentication is performed by verifying a personal identification number (PIN) entered by the user at network terminal 202. Authentication manager 204 sends a command (i.e., a challenge command) to initiate entry of the user's PIN at network terminal 202. The user entry is packaged by network terminal 202 and transmitted to authentication manager 204 (i.e., a challenge response).

Authentication manager 204 verifies the challenge response with user information retained in authentication database 218, information supplied by the user and information that is generated during authentication. When the user is authenticated, the user is given access to a session (e.g., session 208). A session is a persistent representation of a related set of one or more services executing on behalf of a user.

If the expected result is received from the user, authentication manager 204 notifies session manager 206 (via a connect message) that the user has logged into the system on network terminal 202. Session information contained in authentication database 218 is used to identify the computational service provider, port and session identifier (ID) for session manager 206. Session manager 206 is a program that is active on a computational service provider and is connected to authentication manager 204 and network terminal 202 via an interconnection network, for example. Authentication manager 204 sends a message to session manager 206 using session manager 206's computational service provider and port information contained in authentication database 218.

In response to the connect message from authentication manager 204, session manager 206 notifies the services in the user's current session (i.e., the services in session 208) that the user is attached to network terminal 202. That is, session manager 206 sends a connect message to services 230–238 to direct output to network terminal 202. Session manager 206 ensures that services that are considered to be required services of the session are executing. If not, session manager 206 causes them to be initiated. The user can interact with services 230–238 within a session (e.g., session 208). Network terminal 202 is connected to computational service providers 210, 212 and 214 (and services 230–238) via an interconnection network such as a local area network or other interconnection technology. The user can also start new services or terminate existing services.

The user can detach from the system by removing the card from card reader 216. Other mechanisms to express a disconnect can also be used with the invention (e.g., a "sign-off" button on network terminal 202). Services 230–238 can continue to run even after the user removes the card from card reader 216. That is, a user's associated session(s) and the services that comprise a session can continue in existence during the period that a user is unattached (e.g., logged off) from the system. When the user removes the card from card reader 216, network terminal 202 notifies authentication manager 204 (e.g., via a disconnect message) which notifies session manager 206 (e.g., via a disconnect message). Session manager 206 notifies services 230–238 (e.g., via a disconnect message) which terminate their transmission of display commands to network terminal 202. Services 230–238 continue execution, however, during the time that the user is not logged onto a network terminal. The user can log back in using a network terminal such as network terminal 202, connect to session 208 and interact with services 230–238.

Audio Data

Audio data is delivered to and from the desktop by a set of audio commands which are defined as a part of the virtual desktop protocol. Audio reception at a desktop device is supported through what could be thought of as a "universal receiver" approach—any number of streams, of any sample rate data, can be sent to a HID and it will mix and output the streams appropriately. For example, a DAT-quality stereo audio stream could be sent in a 16 bit per sample format at 48 KHz, which would amount to around 1.5 Mbps of data rate. Several of these streams, as well as multiple other audio streams, at other data rates, could be sent to a HID which will effectively re-time and mix all of the streams and generate a system audio output stream.

The audio protocol provides a standard protocol for services to use. In an embodiment of the invention, audio processing and hardware requirements associated with a receiver are minimized by specifying a single audio protocol for transmission of audio data between transmitters on a network and the receiver. The protocol specifies a sampling rate, bit resolution and quantization scheme which allow for high sound quality and further minimize the complexity of the receiver. Transmitters are equipped with drivers to provide for conversion of audio data into the designated protocol as needed.

Aspects of the designated protocol are provided to compensate for problems associated with transmitting audio streams over a network. The designated protocol specifies a format for interleaving audio samples within data packets to minimize errors which are the result of consecutive missing audio data samples due to packet loss. The receiver may further compensate for missing audio data samples through interpolation. In accordance with the designated protocol, a sequence size is specified to govern how the audio data is processed. The transmitter controls the sequence size adaptively to maintain audio latency within a limit specified for each audio application. The designated protocol also provides for determination of a mix mode and a number of channels for specifying how audio data with multiple channels is mixed and routed among multiple audio output devices.

Bandwidth Management

Virtual desktop protocol traffic may be bursty in nature. Long periods of inactivity on the part of a service producer are followed by extremely high bandwidth bursts—e.g., no traffic is generated as a user reads data, and then a full screen update is done once additional data is requested. Peak data-rate bursts in excess of 40 Mbps have been observed, while long-term average data rate is negligible. The fact that bursts have well-defined limits (i.e., ~2 Gbps to change every pixel, each frame time), remain typically below the limits (i.e., usually, some subset of the screen's pixels change, then remain constant for a period of time before the next change), and the bursts are randomly distributed (i.e., users tend to operate independently), all contribute to the ability to take advantage of the gains which come from statistical multiplexing. However, this also requires that some means of handling transient overloads be provided to deal with times when the demand for system resources exceeds the supply. To this end, a rate control mechanism is employed in the management of the interconnection fabric. This is done to ensure that producers do not generate more data than a link, or HID, can handle. This task is made difficult because there are multiple sources sending on a given interconnect link as well as to a given HID. This means that some form of distributed coordination (or cooperation) must be provided to ensure that the system will work. An effective approach to solving this problem is to use congestion avoidance and rate control techniques to manage the interconnect resources, as well as those resources on the desktop. The use of techniques which are compatible with those in current file transfer protocol (FTP) implementations allow virtual desktop protocol traffic to coexist well with standard internet traffic.

When the cumulative data rate of multiple data sources transmitting data over a medium exceeds the bandwidth of the medium, the medium is incapable of transmitting all of the data at the desired data rates. To maintain the data transmission within the bandwidth limit of the medium, some of the data must be delayed or not sent at all. However, when multiple sources are transmitting varying amounts of data at varying times, the selection of which data is to be delayed or dropped becomes quite complex. Inappropriate selection of data to be delayed or dropped can result in severe reductions in system performance. Thus, a technique is needed to manage the communication of data from multiple sources over a medium of finite bandwidth, where the cumulative bandwidth needs of the multiple sources may exceed the bandwidth of the medium.

In one embodiment of the invention, multiple data sources are coupled to a data receiver through a communication medium. The data sources may be any source of information, and the information may be of any type or of multiple types. For example, the information may be computer program code, text, audio data, video data, graphical data, data representative of conditions or events, digital information, analog information, or any other information in any other form. Examples of data sources include computer equipment, audio devices, video devices, user input devices, information storage devices, network equipment, sensors, identification devices, or any other sources of information.

When information is to be sent from a data source to a data receiver, the data source predicts the amount of bandwidth that will be needed to transfer the information at an acceptable data rate. The data source sends an estimate of its bandwidth needs to the data receiver. In an environment with multiple data sources, the data receiver receives estimates of bandwidth needs from multiple data sources. The data receiver adds the estimates of bandwidth needs of the multiple data sources to obtain the cumulative data rate requested by the multiple data sources. The data receiver compares the cumulative data rate requested to the bandwidth of the communication medium over which the information is to pass. If the cumulative data rate requested is less than the bandwidth of the medium, the data receiver does not limit the data rate of any of the multiple data sources. The data receiver allocates to each data source the full amount of bandwidth requested by that data source.

However, if the cumulative data rate requested exceeds the bandwidth of the communication medium, the data receiver compares the amount of bandwidth requested by each data source. For the data sources requesting relatively low amounts of bandwidth, the data receiver allocates all of the requested bandwidth. For the data sources requesting relatively high amounts of bandwidth, the data receiver allocates only a portion of the bandwidth requested. The data receiver balances the benefits of only slightly reducing the requested bandwidth with the benefits of not reducing the requested bandwidth at all to determine the number of data sources affected by the reduction and the extent of bandwidth reduction for each affected data source.

In one embodiment of the invention, data sources produce estimates of the bandwidth they will likely require by monitoring commands being sent to the data receiver. For example, a data source comprising an X window computational service provider monitors commands sent to an X window client program. By monitoring such commands, the X window computational service provider can determine the number of bits and the number of pixels to be transmitted and an ideal period of time over which such transmission should occur. By dividing the number of bits by the ideal period of time, the X window computational service provider can obtain an ideal data rate expressed in bits per second for the data generated by the commands. Likewise, by dividing the number of pixels by the ideal period of time, the X window computational service provider can obtain an ideal data rate expressed in pixels per second for the data generated by the commands. These ideal data rates can be used as initial estimates of bandwidth needs.

As this monitoring and estimation process continues, the historical information concerning the data rates can be used to produce statistical parameters descriptive of the data rates. For example, the average data rate or a data rate equal to the average data rate plus one standard deviation can be accurately approximated and used to determine future bandwidth allocations.

The data sources can perform such monitoring, analysis, and estimation of data rate parameters during periods when they are not transmitting data or, if sufficient computing resources exist at the data sources, during periods when they are transmitting data. For example, if a reduction of allocated bandwidth slows the rate at which a data source can transmit data, the data source may be able to use the time while it waits to transmit the data to perform the monitoring, analysis, and estimation of data rate parameters.

Adaptably Optimizing Data Traffic

In accordance with one embodiment of the invention, the computational service provider is configured to transmit one or more data streams through a viable interconnection fabric to multiple HIDs. The data stream is configured by the computational service provider to adaptably meet the performance needs of the HID receiving the data stream. This enables multiple HIDs to receive variants of the same data stream that may differ in quantity, quality, and/or data format. For example, referring now to FIG. 5, computational service provider 500 may elect to provide HID 510 with low-resolution data and HID 512 with high-resolution data. The quantity and/or quality of data sent to a HID is dependant upon the conditions encountered by the computational service provider when it attempts to transmit data across interconnection fabric 525.

Decode Module

In one embodiment of the invention, a decode module 505 residing on computational service provider 500 aids in the optimization process. Decode module 505 prepares data for transmission to HIDs 510–512 by separating decoded data into individual process 507–509. Decode module 505 is capable of processing numerous data formats and, for example, may prepare different types of video or audio data for transmission to HIDs that request it. MPEG data, AVI data, WAV data, or other types of data formats are examples of data that is processed by decode module 505 using techniques known by a practitioner skilled in the art. In some instances decode module 505 utilizes software drivers to prepare data for transmission. In other instances decode module uses analog video input hardware to decode data. Decode module 505 can obtain data for decoding (e.g. video file 515) from data store 535. Decode module may also obtain such data from other computers accessible via interconnection fabric 525.

Once decode module 505 makes data ready for transmission computational service provider 500 makes the data available to multiple processes via a shareable memory segment. Each process is associated with an active session on computational service provider 500 and may have a different set of characteristics. In one embodiment of the invention, the number of sessions is related to the number of HIDs that have requested decoded data, or a file that is to be converted to decoded data, from computational service provider 500. If, for example, three HIDs 510–512 simultaneously issue a request for video file 515 computational service provider 500 utilizes decode module 505 to ready video file 515 for distribution. Decode module 505 accepts video file 515 as input and generates a decoded data stream, which may be placed in the shareable memory segments, as output. As a result, video file 515 is decoded into a form that is ready for transport across interconnection fabric 525. The processes for the HIDs then forwards the data from the shareable memory segment to interconnection fabric 525 for delivery to the HID displays. If, for example, video file 515 is in the MPEG format decode module 505 transforms the MPEG data stream into a data format ready for transport across interconnection fabric 525. Interconnection fabric 525 may be any type of communication medium capable of transmitting data from computational service provider computer 500 to HIDs 510–512.

In accordance with one embodiment of the invention, the data transmission load placed on the computational service provider 500 and the interconnection fabric 525 is reduced by minimizing the amount of decoded data sent to a receiving HID. If, for example, HID 510 is less capable of handling video data than HID 511, then computational service provider 500 may elect to send lower quality data to HID 510 than it sends to HID 511. This is accomplished by fluctuating the quality of data associated with each process 507–508. For example, the process 507 associated with HID 510 may be of a lesser quality than the process 508 associated with HID 511. Also by using a common decode module and sharing its output stream, the processing load on computational service provider 500 is reduced. Further, in the case that a hardware decoder must be used, the number of HIDs 510 receiving the decoded data can be greater than the number of hardware decoders available due to the sharing of decoder output.

When the quality of data requested by HIDs 510–512 is less than the quality of data decode module 505 is capable of producing then computational service provider 500 may elect to have decode module 505 output data that is no greater in quality than the quality of data that is requested. For example, if decode module 505 is capable of generating three different types of audio data streams (high quality, medium quality, or low quality) and HID 510 issues a request for low quality audio data while HID 512 issues a request for medium quality audio data then it is not necessary for decode module 505 to output high quality audio data until such data is requested. If, however, HID 511 issues a request for high quality audio data, then decode module 505 will begin to output high quality audio data. As a result, decode module 505 utilizes less processing resources during periods of lower quality usage.

Processes

Before the data stream prepared by decode module 505 is transmitted across interconnection fabric 525 to HIDs 510–512, computational service provider 500 makes it available to a plurality of individual processes 507–509 via a shared memory segment. Each process is correlated to an active session on computational service provider 500 and may have a different set of characteristics. In one embodiment of the invention, each process is optimized for transport to a specific HID. In other instances, the processes have a set of common characteristics determined by decode module 505.

If an additional HID issues a request for video file 515 then an additional process is created. Each time another request is issued computational service provider 500 creates another process. The total number of processes created is not limited by the number of HIDs 510–512. In some instances, however, more processes than the number of HIDs 510–512 are created whereas in other cases fewer processes are created. Separating the output generated by decode module 505 from the transmission of the data over interconnect fabric 525 provides a way for computational service provider 500 to distribute a data stream to multiple recipients while only having to decode video file 515 once. This reduces the amount of processing computational service provider 500 is required to engage in to transmit video to simultaneous recipients and also allows for the efficient use of network bandwidth.

In one embodiment of the invention the amount of resources needed to simultaneously provide data to multiple HIDs is reduced by controlling the amount of data transported across interconnection fabric 525. For example, if HID 510 and HID 512 both request data from computational service provider 500, but only HID 510 has the capacity to display high-resolution video data then computational service provider 500 may elect to send high-resolution video data to HID 510 and lower-resolution video data to HID 512. Each HID may receive a different data stream thereby reducing the likelihood of overloading interconnection fabric 525. In one embodiment of the invention, processes 507–509 are adjusted to correlate with the type of network connection coupled to the HID requesting data. The computational service provider may adjust processes 507–509 by sending a portion of the process across the interconnection fabric 525. For example, if each process 507-509 has a resolution of 1024×768, then computational service provider may elect to reduce the process to 640×480 before transmitting the data comprising the process across interconnection fabric 525. This provides a way for computational service provider 500 to exercise preferential control over what quantity and/or quality of data different HIDs receive. For example, computational service provider only transmits a limited amount of data to HIDs connected via a modem.

HIDs connected via mediums with a higher data transfer rate receive larger quantities of data.

A benefit of separating the decoding step from the transmission processes is that it enables the transmission process to make independent choices about the relative importance of the decoded data when transmitting over a restricted bandwidth link to the computational service provider 500. For example, a HID could indicate that high quality audio is more important than video. In response to such an indication the process could elect to reduced the amount of video data and continue sending a full audio stream. Alternately, another HID might not care about audio and indicate a desire to have higher quality video instead of a higher quality audio stream. When this is the case, the process could decide to continue sending a full video stream and reduce the amount of audio data being sent. Therefore separating the transmissions allows for different quality judgments to be made when trying to adapt to different bandwidth restrictions.

Permissions

Figure 6:
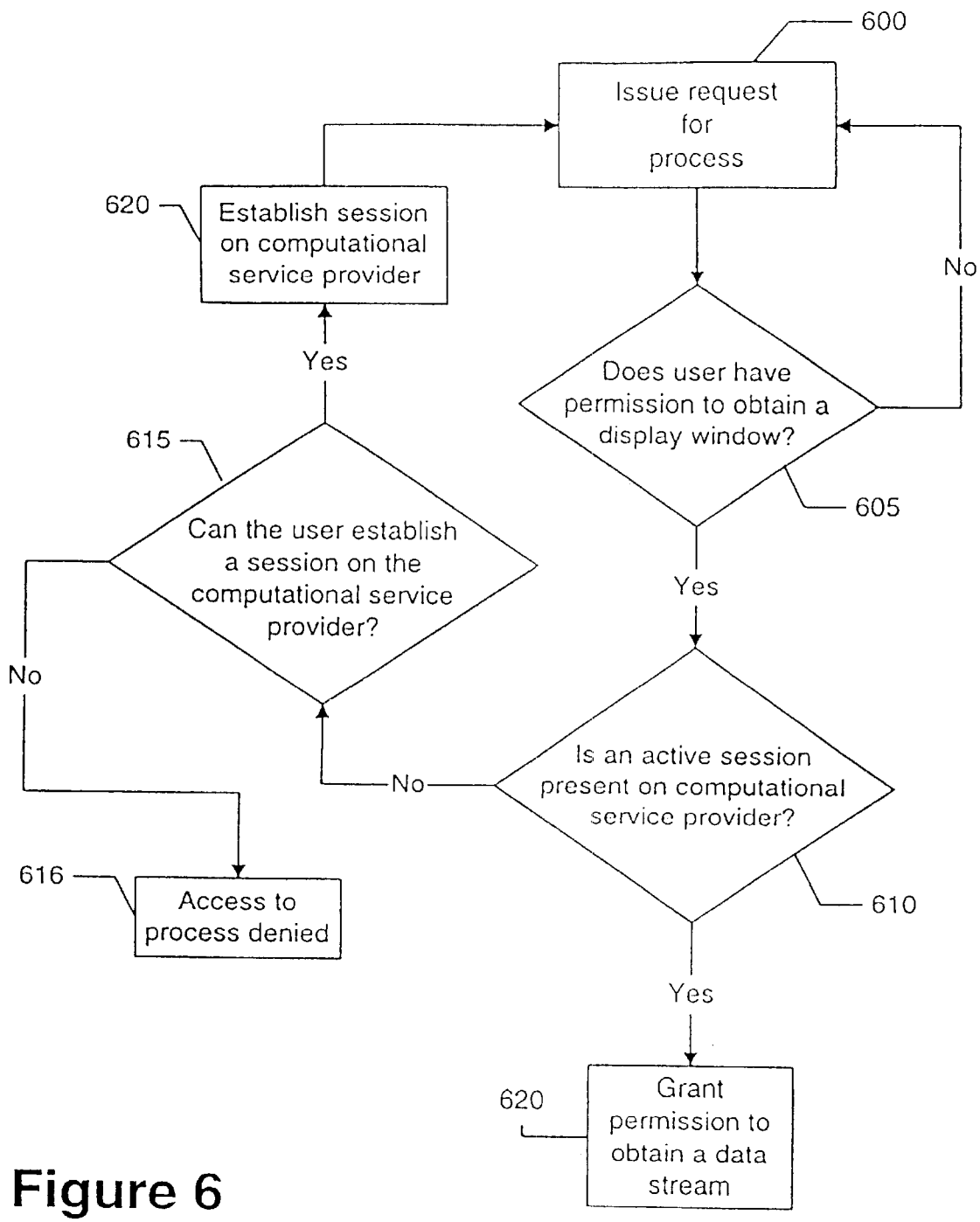
FIG. 6 illustrates how one embodiment of the invention determines whether a particular HID has permission to obtain data from a computational service provider.

In one embodiment of the invention, computational service provider 500 determines whether a particular user has permission to access the processes 507–509 resulting from the data stream generated by decode module 505. For example, referring now to FIG. 6 an example of the method used to determine if a user has permission to access a process is shown. At step 600, the user issues a request for data to computational service provider 500. In one embodiment of the invention, step 600 is automatically executed without any input from the user. In response to the issued request, computational service provider 500 utilizes two forms of security to determine if the user is authorized to obtain the requested data. At step 605, computational service provider 500 examines whether the user has permission to obtain a display window. When a user logs onto computational service provider 500, for example, computational service provider 500 authenticates the user's log on information and provides the user with a display window. Step 605 checks to see if this authentication procedure was properly completed.

At step 610, computational service provider 500 determines whether the HID requesting the process has an active session on computational service provider 500. If an active session exists, then step 620 is executed and the HID is granted permission to obtain the process it is requesting. If, however, an active session does not exist on computational service provider 500, then step 615 is executed. At step 615, the computational service provider determines whether the HID requesting access to the process has permission to establish an active session on computational service provider 500. If, permission is granted, then the HID establishes an active session on the computational service provider at step 620 and the HID may reissue a request for a process by executing step 600. If the HID is not granted permission to establish an active session then access to the process is denied at step 616.

Resource Optimization

Figure 7:
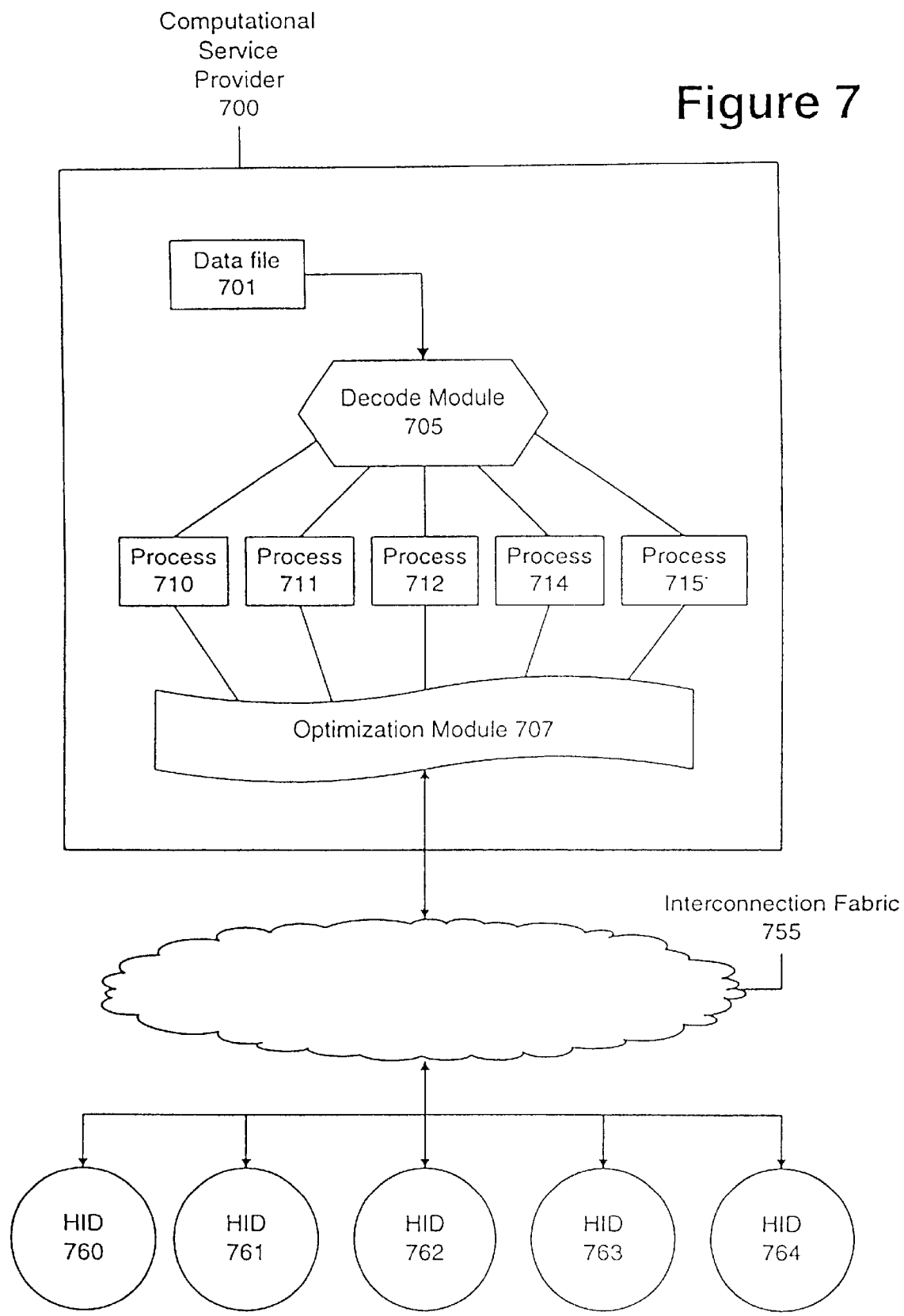
FIG. 7 illustrates an embodiment of the invention that utilizes a resource allocation module to prepare data for transmission to a requesting HID.

Referring now to FIG. 7, an embodiment of the invention is shown that utilizes a resource optimization module to determine how much bandwidth to consume while transmitting a particular data stream to a HID. For example, HIDs 760–764 may simultaneously request data file 701 from computational service provider 700. In response computational service provider 700 converts data file 701 into a data stream using decode module 705. The data stream is then separated into independent processes 710–715. Resource optimization module 707 resides on computational service provider 700 and communicates with HIDs 717–722 to determine how much bandwidth it may consume while transmitting processes 710–715.

If, for example, HID 763 initiates a request for data file 701, then resource optimization module sends HID 763 a message stating the amount of bandwidth it would like to consume while transmitting data file 701 across interconnection fabric 755. Interconnection fabric 755 may be the Internet or any other type of telecommunication medium. HID 763 responds with a second message that identifies how much network bandwidth is available. Each HID 760–764 separately negotiates the amount of bandwidth to be used for transmission. If, for example, HID 760 is connected to interconnection fabric 755 via a modem connection and HID 761 is connected via an Ethernet network, then HID 760 is allocated less bandwidth than HID 761. Each HID 760–764 is transmitted an amount of data that appropriately balances the data requirements of the user with the amount of available network bandwidth.

Figure 8:
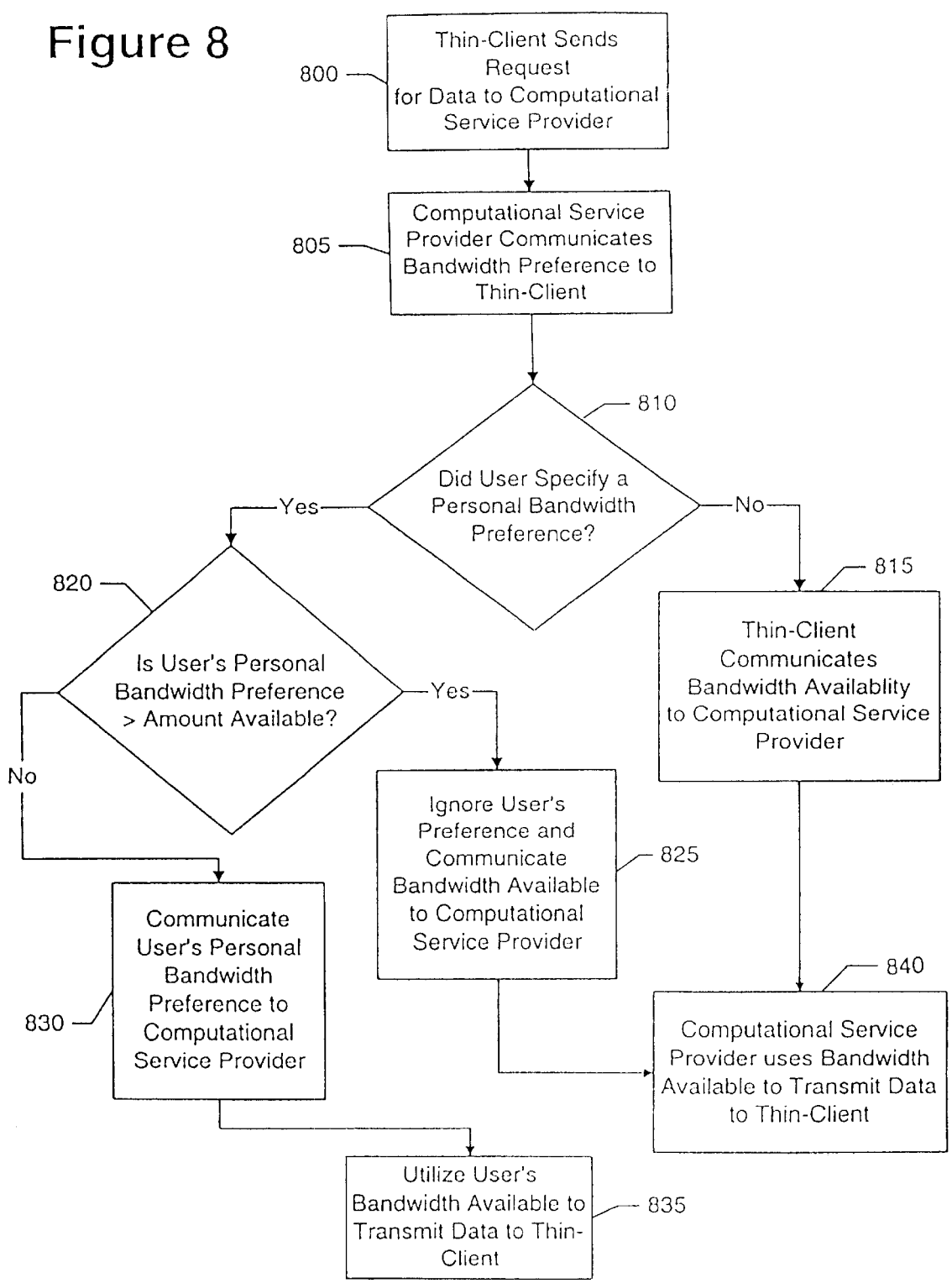
FIG. 8 illustrates the process used to determine how to optimally prepare data for transport to a requesting HID.

Referring now to FIG. 8, the process used by resource optimization module to determine how much network bandwidth to utilize while transmitting data to a particular HID is illustrated. At step 800, a HID initiates a request for data to computational service provider 700. In one embodiment of the invention, the request pertains to data residing on computational service provider 700. A HID, however, may also contact computational service provider 700 to obtain data from other sources. For example, HID 763 may request data file 701 or the processes 710–715 generated by decode module 705. HID 763 may also request data from other sources available to computational service provider 700 via interconnection fabric 755.

In response to a request for data from a HID, computational service provider 700 proceeds to step 805. At step 805, computational service provider 700 communicates a bandwidth preference to the HID. In one embodiment of the invention, computational service provider 700's bandwidth preference is transmitted to the HID in a bandwidth preference message. The bandwidth preference message specifies the amount of bandwidth computational service provider 700 wishes to use to transmit data. For example, if the network connecting computational service provider 700 and HID 764 supports a data transmission rate of 100 megabits per second the bandwidth preference message identifies what portion of that capacity to use to transmit the requested file. If computational service provider 700 is attempting to send high-resolution video to HID 764, then the bandwidth preference message may request all 100 megabits. Whether computational service provider 700 is granted the amount of bandwidth it requests is dependent upon how much bandwidth is currently available. The amount of bandwidth available may vary according to the portion used by other networks devices and/or network services.

In one embodiment of the invention, the user has control over the amount of bandwidth utilized. If, for example, the user wishes to consume a specific amount of network resources, then the user may communicate this to computational service provider 700 via a personal bandwidth preference message. At step 810, the HID determines whether or not the user has stated a personal bandwidth preference. If the user has a personal bandwidth preference then the HID proceeds to step 820 where a determination is made as to whether the user's preference is greater than the amount of network bandwidth requested by computational service provider 700. If the user's personal bandwidth preference is less than the amount of bandwidth available, the HID transmits a bandwidth allocation message to computational service provider 700 that identifies the amount of bandwidth the user wishes to consume. At step 835, the computational service provider uses the amount of bandwidth identified in the user's personal bandwidth preference message.

If the user's personal bandwidth preference is greater than the amount of bandwidth available then the HID proceeds to step 825 where it ignores the user's preference and communicates the amount of actual bandwidth available to computational service provider 700 using a bandwidth allocation message. Once this occurs computational service provider 700 proceeds to step 840 where it utilizes the amount of bandwidth specified in the bandwidth allocation message to transmit data to the requesting HID.

If the outcome of the determination made at step 810 is that the user, does not have a personal bandwidth preference then the HID proceeds to step 815. At step 815, the HID responds by transmitting a bandwidth allocation message to computational service provider 700. In one embodiment of the invention, the bandwidth allocation message informs computational service provider 700 how much bandwidth is available for use. This determination occurs automatically without obtaining any input from the user. At step 840, the computational service provider begins transmitting data to the HID in a way that takes into account the amount of bandwidth available for use. As a result, the amount of data transmitted to the HID by the computational service provider coincides with the amount of network bandwidth available to the HID.

In one embodiment of the invention, step 840 modifies the processes created by the computational service provider to adaptably meet the performance needs of the HID requesting the process. For example, if the size of a particular process consumes to great a portion of bandwidth then the computational service provider can reduce the size of the process before transmitting it to the requesting HID. This enables multiple HIDs to receive variants of the same data stream that may differ in quantity, quality, and/or data format.

Embodiment of Computer Execution Environment (Hardware)

Figure 4:
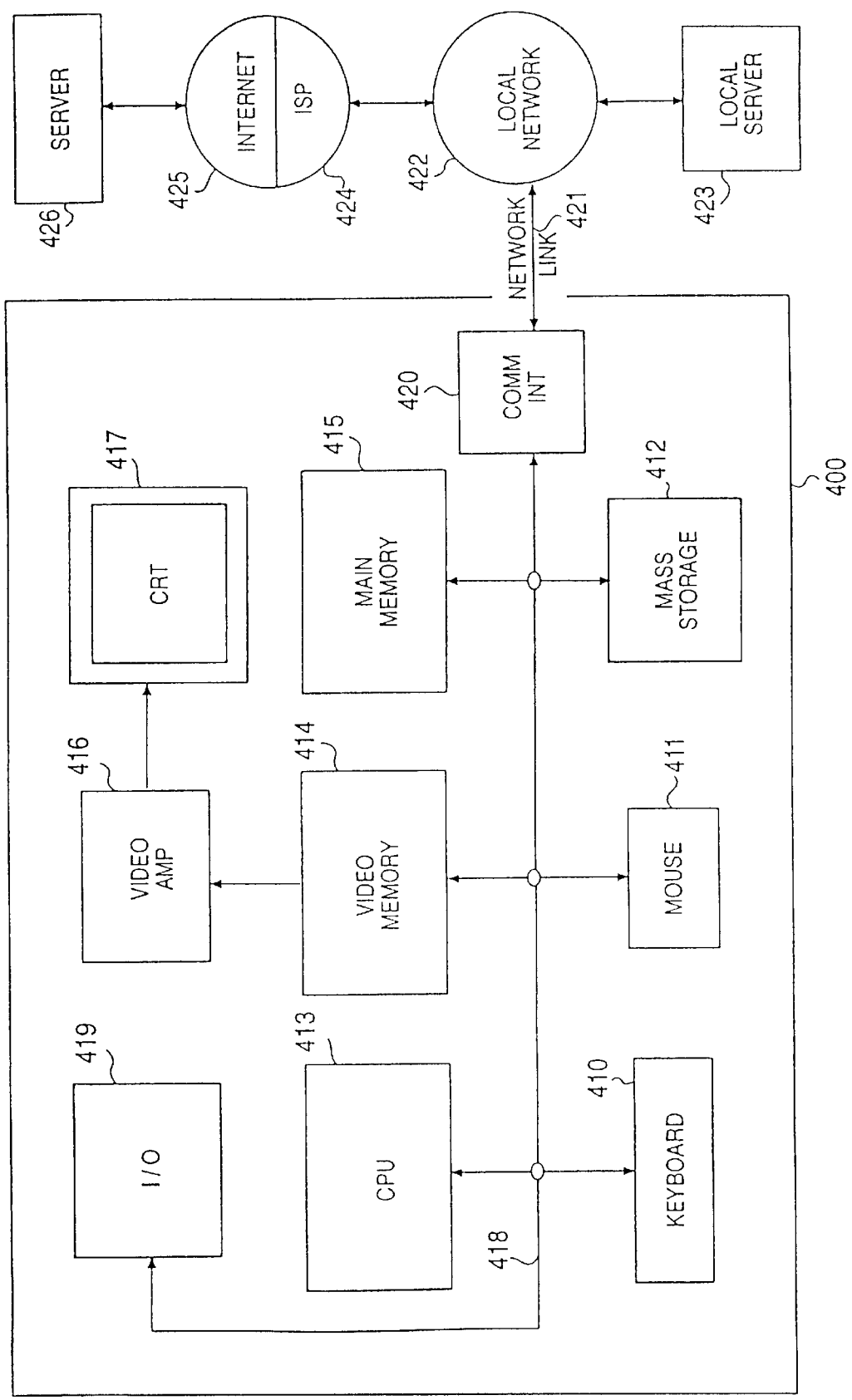
FIG. 4 illustrates an execution environment for one embodiment of the invention.

An embodiment of the invention can be implemented as computer software in the form of computer readable code executed on a general purpose computer such as computer 400 illustrated in FIG. 4, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 410 and mouse 411 are coupled to a system bus 418. The keyboard and mouse are for introducing user input to the computer system and communicating that user input to processor 413. Other suitable input devices may be used in addition to, or in place of, the mouse 411 and keyboard 410. I/O (input/output) unit 419 coupled to system bus 418 represents such I/O elements as a printer, A/V (audio/video) I/O, etc.

Computer 400 includes a video memory 414, main memory 415 and mass storage 414, all coupled to system bus 418 along with keyboard 410, mouse 411 and processor 413. The mass storage 414 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 64-bit data bus for transferring data between and among the components, such as processor 413, main memory 415, video memory 414 and mass storage 414. Alternatively, multiplex data/address lines may be used instead of separate data and address lines.

In one embodiment of the invention, the processor 413 is a microprocessor manufactured by Sun Microsystems, Inc., such as the SPARC™ microprocessor, or a microprocessor manufactured by Motorola, such as the 680×0 processor, or a microprocessor manufactured by Intel, such as the 80×86, or Pentium processor. However, any other suitable microprocessor or microcomputer may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images.

Computer 400 may also include a communication interface 440 coupled to bus 418. Communication interface 440 provides a two-way data communication coupling via a network link 441 to a local network 444. For example, if communication interface 440 is an integrated services digital network (ISDN) card or a modem, communication interface 440 provides a data communication connection to the corresponding type of telephone line, which comprises part of network link 441. If communication interface 440 is a local area network (LAN) card, communication interface 440 provides a data communication connection via network link 441 to a compatible LAN. Wireless links are also possible. In any such implementation, communication interface 440 sends and receives electrical, electromagnetic or optical signals which carry digital data streams representing various types of information.

Network link 441 typically provides data communication through one or more networks to other data devices. For example, network link 441 may provide a connection through local network 444 to local computational service provider computer 443 or to data equipment operated by an Internet Service Provider (ISP) 444. ISP 444 in turn provides data communication services through the world wide packet data communication network now commonly referred to as the "Internet" 445. Local network 444 and Internet 445 both use electrical, electromagnetic or optical signals which carry digital data streams. The signals through the various networks and the signals on network link 441 and through communication interface 440, which carry the digital data to and from computer 400, are exemplary forms of carrier waves transporting the information.

Computer 400 can send messages and receive data, including program code, through the network(s), network link 441, and communication interface 440. In the Internet example, remote computational service provider computer 446 might transmit a requested code for an application program through Internet 445, ISP 444, local network 444 and communication interface 440.

The received code may be executed by processor 413 as it is received, and/or stored in mass storage 414, or other non-volatile storage for later execution. In this manner, computer 400 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, computational service providers on a network, and carrier waves.

The computer systems described above are for purposes of example only. An embodiment of the invention may be implemented in any type of computer system or programming or processing environment. When a general purpose computer system such as the one described executes the process and process flows described herein, it is configured to adaptably distribute data to one or more recipient devices.

Thus, a method and apparatus for adaptably providing data to network environment is described.

What is claimed is:

1. A method for adaptively providing data comprising:

providing user interfaces through a thin client;

sending a request for a process from said thin client to a computational service provider via a network having a bandwidth limitation for said thin client;

determining whether to allow said thin client access to said process;

decompressing a data file into a data stream for transporting across said network;

providing said data stream to said process;

communicating with said thin client to optimize said process for transport to said thin client if said thin client is allowed access to said process;

modifying said process to account for said bandwidth limitation; and providing said process to said thin client via said network;

wherein said step of determining whether to allow said thin client access to said process further comprises:

determining whether said thin client has a first active session on said computation service provider;

granting said first active session to said thin client if said thin client has said first active session on said computation service provider;

determining whether said thin client has permission for a second active session on said computation service provider if said thin client does not have said first active session on said computation service provider; and establishing said second active session on said computation service provider for said thin client if said thin client has permission for said second active session on said computation service provider.

2. The method of claim 1, wherein said process is associated with said first active session.

3. A method for adaptively providing data comprising:

providing user interfaces through a thin client;

sending a request for a process from said thin client to a computational service provider via a network having a bandwidth limitation for said thin client;

determining whether to allow said thin client access to said process;

decompressing a data file into a data stream for transporting across said network;

providing said data stream to said process;

communicating with said thin client to optimize said process for transport to said thin client if said thin client is allowed access to said process;

modifying said process to account for said bandwidth limitation; and providing said process to said thin client via said network;

wherein said step of determining whether to allow said thin client access to said process further comprises:

determining whether said thin client has permission to obtain a display window;

determining whether said thin client has a first active session on said computation service provider if said thin client has permission to obtain said display window;

granting said first active session to said thin client if said thin client has said first active session on said computation service provider;

determining whether said thin client has permission for a second active session on said computation service provider if said thin client does not have said first active session on said computation service provider; and establishing said second active session on said computation service provider for said thin client if said thin client has permission for said second active session on said computation service provider.

* * * * *